US011442722B2

(12) United States Patent
Ren et al.

(10) Patent No.: US 11,442,722 B2
(45) Date of Patent: *Sep. 13, 2022

(54) TREE-CONVERSION DELTA ENCODING

(71) Applicant: Beijing Voyager Technology Co., Ltd., Beijing (CN)

(72) Inventors: Liwei Ren, San Jose, CA (US); Jiang Zhang, San Jose, CA (US); Xiaoyong Yi, Fremont, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 229 days.

This patent is subject to a terminal disclaimer.

(21) Appl. No.: 16/233,606

(22) Filed: Dec. 27, 2018

(65) Prior Publication Data

US 2020/0210375 A1 Jul. 2, 2020

(51) Int. Cl.
*G06F 8/71* (2018.01)
*G06F 16/11* (2019.01)
*G06F 16/901* (2019.01)
*G06F 16/13* (2019.01)

(52) U.S. Cl.
CPC .............. *G06F 8/71* (2013.01); *G06F 16/116* (2019.01); *G06F 16/13* (2019.01); *G06F 16/9017* (2019.01); *G06F 16/9027* (2019.01)

(58) Field of Classification Search
CPC .... G06F 16/116; G06F 16/13; G06F 16/9027; G06F 16/9017; G06F 8/71
See application file for complete search history.

(56) References Cited

U.S. PATENT DOCUMENTS

| 7,797,279 | B1 * | 9/2010 | Starling ............. G06F 11/1451 707/641 |
| 8,498,965 | B1 | 7/2013 | Ren et al. |
| 8,775,392 | B1 * | 7/2014 | Walker .................... G06F 8/71 707/695 |
| 8,862,555 | B1 | 10/2014 | Xu et al. |
| 9,098,513 | B1 | 8/2015 | Ren et al. |
| 2003/0225795 | A1 | 12/2003 | Abdallah et al. |

(Continued)

FOREIGN PATENT DOCUMENTS

CN  102902555 A  1/2013

OTHER PUBLICATIONS

TarDiff: Quick Reference and Download. Jun. 6, 2005. Retrieved on Apr. 29, 2019 from http://tardiff.sourceforge.net/tardiff-help.html. Sections: Description, Arguments (16 pages).

(Continued)

*Primary Examiner* — Anhtai V Tran
*Assistant Examiner* — Xiaoqin Hu
(74) *Attorney, Agent, or Firm* — Sheppard Mullin Richter & Hampton LLP

(57) ABSTRACT

A first data tree and a second data tree may be accessed. The first data tree may include a first set of directory nodes and a first set of file nodes, and the second data tree may include a second set of directory nodes and a second set of file nodes. The first data tree may be converted into a first data tree file, and the second data tree may be converted into a second data tree file. A delta for the first data tree and the second data tree may be generated based on a comparison of the first data tree file and the second data tree file.

17 Claims, 8 Drawing Sheets

(56) References Cited

U.S. PATENT DOCUMENTS

| | | | |
|---|---|---|---|
| 2008/0109498 A1* | 5/2008 | Bhandiwad | G06F 16/113 |
| 2015/0186370 A1 | 7/2015 | Xu et al. | |
| 2015/0186407 A1* | 7/2015 | Xu | G06F 16/1873 |
| | | | 707/638 |
| 2015/0234885 A1 | 8/2015 | Weinstein et al. | |
| 2018/0173723 A1* | 6/2018 | Pfeifle | G06F 16/116 |
| 2019/0004785 A1* | 1/2019 | Kelley | G06Q 20/3829 |

OTHER PUBLICATIONS

PCT International Search Report and the Written Opinion dated Mar. 29, 2019, issued in related International Application No. PCT/US2018/067656 (10 pages).

PCT International Search Report and the Written Opinion dated Apr. 2, 2019, issued in related International Application No. PCT/US2018/067709 (11 pages).

Non-Final Office Action dated Jul. 13, 2020, issued in related U.S. Appl. No. 16/233,958 (24 pages).

Final Office Action dated Jan. 1, 2021, issued in related U.S. Appl. No. 16/233,958 (28 pages).

Final Office Action dated Jul. 28, 2021, issued in related U.S. Appl. No. 16/233,958 (29 pages).

PCT International Preliminary Report on Patentability dated Jul. 8, 2021, issued in related International Application No. PCT/US2018/067709 (8 pages).

PCT International Preliminary Report on Patentability dated Jul. 8, 2021, issued in related International Application No. PCT/US2018/067656 (7 pages).

\* cited by examiner

TREE-CONVERSION DELTA ENCODING

TECHNICAL FIELD

The disclosure relates generally to encoding delta using tree-conversion.

BACKGROUND

Delta encoding may be used to track changes within different versions of a file. However, software may contain a number of files and a number of directories. Developing a framework for using delta encoding to track changes and similarities between files and folders may be complex and time consuming.

SUMMARY

One aspect of the present disclosure is directed to a system for tree-conversion delta encoding. The system may comprise one or more processors and a memory storing instructions. The instructions, when executed by the one or more processors, may cause the system to perform: accessing a first data tree, the first data tree including a first set of directory nodes and a first set of file nodes; accessing a second data tree, the second data tree including a second set of directory nodes and a second set of file nodes; converting the first data tree into a first data tree file; converting the second data tree into a second data tree file; and generating a delta for the first data tree and the second data tree based on a comparison of the first data tree file and the second data tree file; wherein: a pack format of a data tree file includes a tree definition in a header, defines individual file nodes of the data tree using a file name, a file type, and a data location, and defines individual directory nodes of the data tree using a directory name and a directory type; and data of the individual file nodes are placed within the data tree file in an order of data-tree traversal.

In some embodiments, the pack format of the data tree file may be platform independent and may not include time stamp information, ownership information or version information.

Another aspect of the present disclosure is directed to a system for tree-conversion delta encoding. The system may comprise one or more processors and a memory storing instructions. The instructions, when executed by the one or more processors, may cause the system to perform: accessing a first data tree, the first data tree including a first set of directory nodes and a first set of file nodes; accessing a second data tree, the second data tree including a second set of directory nodes and a second set of file nodes; converting the first data tree into a first data tree file; converting the second data tree into a second data tree file; and generating a delta for the first data tree and the second data tree based on a comparison of the first data tree file and the second data tree file.

Another aspect of the present disclosure is directed to a method for tree-conversion delta encoding. The method may comprise: accessing a first data tree, the first data tree including a first set of directory nodes and a first set of file nodes; accessing a second data tree, the second data tree including a second set of directory nodes and a second set of file nodes; converting the first data tree into a first data tree file; converting the second data tree into a second data tree file; and generating a delta for the first data tree and the second data tree based on a comparison of the first data tree file and the second data tree file.

In some embodiments, the comparison of the first data tree file and the second data tree file may be performed using bsdiff, xdelta, or zdelta.

In some embodiments, conversion of a data tree into a data tree file may be performed using tar.

In some embodiments, a pack format of a data tree file may be platform independent and may not include time stamp information, ownership information or version information. The pack format of the data tree file may include a tree definition in a header, may define individual file nodes of the data tree using a file name, a file type, and a data location, and may define individual directory nodes of the data tree using a directory name and a directory type. Data of the individual file nodes may be placed within the data tree file in an order of data-tree traversal.

In some embodiments, the delta for the first data tree and the second data tree may be generated as a set of differences to be applied to a copy of the first data tree file to construct a copy of the second data tree file. The copy of the second data tree file may be converted into a copy of the second data tree.

In some embodiments, a client, responsive to receiving the delta, may be configured to perform: accessing the first data tree and the delta; converting the first data tree into the copy of the first data tree file; constructing the copy of the second data tree file by applying the delta to the copy of the first data tree file; and converting the copy of the second data tree file into the copy of the second data tree.

In some embodiments, the delta for the first data tree and the second data tree may be generated as a set of differences to be applied to an empty file to construct a copy of the second data tree file. The copy of the second data tree file may be converted into a copy of the second data tree.

In some embodiments, a client, responsive to receiving the delta, may be configured to perform: accessing the delta; constructing the copy of the second data tree file by applying the delta to an empty file; and converting the copy of the second data tree file into the copy of the second data tree.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein enable use of file-based delta encoding to generate deltas for data trees. By converting data trees into data tree files, deltas may be generating by using file-based delta encoding to compare the data tree files. The delta may be applied to a data tree by converting the data tree into a data tree file, applying the delta to the data tree file, and converting the data tree file back into a data tree. Such use of tree-conversion delta encoding to generate deltas for data trees allows file-based delta encoding to be used to determine similarities and differences between multiple files and directories within the data trees by comparing two files, rather than individually comparing all files or directories of the data trees.

Figure 1:
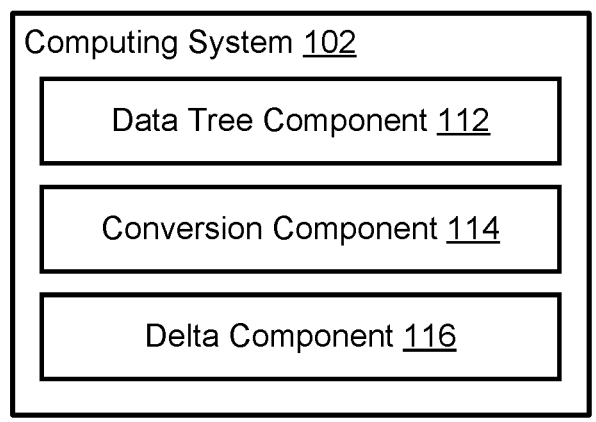
FIG. 1 illustrates an example environment for tree-conversion delta encoding, in accordance with various embodiments of the disclosure.

FIG. 1 illustrates an example environment 100 for tree-conversion delta encoding, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a data tree component 112, a conversion component 114, and a delta component 116. The computing system 102 may include other components. While the computing system 102 is shown in FIG. 1 as a single entity, this is merely for ease of reference and is not meant to be limiting. One or more components or one or more functionalities of the computing system 102 described herein may be implemented in software. One or more components or one or more functionalities of the computing system 102 described herein may be implemented in hardware. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds.

The data tree component 112 may be configured to access one or more data trees. A data tree may include or be representative of a hierarchical tree structure of data. A data tree may include a root value and subtrees of children with a parent node. A data tree may include or represent file directories and files, with relationship between the directories and files represented by links among the nodes. For example, a parent directory may include a file and a sub-directory, and the nodes representing the file and the sub-directory may be linked with the node representing the parent directory. A data tree may include the files and the directory themselves. For example, a data tree accessed by the data tree component 112 may include a data tree of software. Software may contain multiple files and multiple directories. For example, rather than being included within a single file, software may include multiples files that are organized within multiple directories, which are organized in a tree structure. That is, the software may be organized in one or more directories and one or more files, and the data tree accessed by the data tree component 112 may include the director(ies) and file(s) of the software.

A data tree may include a set of directory nodes and a set of file nodes. A set of directory nodes may include one or more directory nodes, and a set of file nodes may include one or more file nodes. A file node may be included within a directory node. A directory node may be included or nested within another directory node. A directory node may include or represent a file directory, and a file node may include or represent a file.

For example, the data tree component 112 may access a first data tree and a second data tree. The first data tree including a first set of directory nodes and a first set of file nodes, and the second data tree including a second set of directory nodes and a second set of file nodes. In some embodiments, the first data tree may include a first version of a data tree and the second data tree may include a second version of the data tree. For example, the data tree component 112 may access a first version and a second version of software by accessing the corresponding data trees. Thus, the data tree component 112 may access different versions of software by accessing different data trees of the software.

Accessing a data tree may include one or more of acquiring, analyzing, determining, examining, identifying, loading, locating, obtaining, opening, receiving, retrieving, reviewing, storing, or otherwise accessing the data tree. The data tree component 112 may access a data tree from one or more locations. For example, the data tree component 112 may access a data tree from a storage location, such as an electronic storage of the computing system 102, an electronic storage of a device accessible via a network, another computing device/system (e.g., desktop, laptop, smartphone, tablet, mobile device), or other locations.

Identifying similar or modified nodes within the data trees for delta encoding may be difficult. For example, it may be difficult to determine whether and to what extent a first directory node in a first data tree has been modified (e.g., file name changed, file added, file deleted, file modified, directory name changed, directory added, directory deleted, directory modified) to generate a second directory node in a second data tree, or whether the second directory node has been created without any relation to the first directory node. As data trees become more complex, tracking changes and similarities between files and folders may become more difficult. To overcome this deficiency in individual file/directory delta encoding, a data tree may be converted into a data tree file. A data tree file may refer to a file that includes information on the data tree. Multiple data tree files may be compared using file-based delta encoding technologies to determine similarities and changes between the data tree. For example, rather than comparing a data tree of a particular software version with another data tree of a different software version, the data trees of different versions of software may be converted into data tree files and the data tree files may be compared using file-based delta encoding to determine changes between the different versions of software.

The conversion component 114 may be configured to convert a data tree into a data tree file. For example, the conversion component 114 may convert a first data tree into a first data tree file and a second data tree into a second data tree file. A data tree file may include information on the data tree. A function that converts a data tree into a data file may be represented as T2F(T) (tree-to-file), while T represents the data tree. A reverse function may be performed to convert a data tree file into a data tree, and may be represented as F2T(F) (file-to-tree), where F represents the data tree file. In some embodiments, conversion of a data tree into a data tree file may be performed using tar. Use of other tools for tree-to-file and file-to-tree conversions are contemplated.

In some embodiments, the conversion component 114 may convert a data tree into a data tree file using a pack format. A pack format of a data tree file may refer to the structure or the organization according to which information is arranged within the data tree file. In some embodiments, a pack format of a data tree file may be platform independent and may not include non-generic information, such as time stamp information, ownership information, or version information.

In some embodiments, a pack format of a data tree file may include a tree definition in a header. The tree structure may be defined within the tree definition such that individual file nodes of the data tree are defined using a file name, a file type, and a data location, and individual directory nodes of the data tree are defined using a directory name and a directory type. Data of individual file nodes may be placed within the data tree file in an order of data-tree traversal. That is data of files within the data tree may be placed in the order in which the data tree is traversed for tree-to-file conversion.

The delta component 116 may be configured to generate a delta for two data trees based on a comparison of corresponding data tree files. For example, the delta component 116 may generate a delta for a first data tree and a second data tree based on a comparison of a first data tree file corresponding to the first data tree and a second data tree file corresponding to the second data tree. A delta may refer to differences between two data, such as the two data tree or the two data tree files. In some embodiments, the comparison of the data tree files (e.g., the first data tree file and the second data tree file) may be performed using bsdiff, xdelta, or zdelta. In some embodiments, the comparison of the data tree files may be performed using a greedy-algorithm based tool. Use of other delta-encoding tools are contemplated.

Generation of a delta by the delta component 116 may be represented as:

$\Delta=F_2-F_1$, where F represents a data tree file

Construction of a data tree file based on another data tree file and a delta may be represented as:

$F_2=F_1+\Delta$

Generation of a delta from data trees may be represented as:

$F_1=T2F(T_1)$ $F_2=T2F(T_2)$ $\Delta=F_2-F_1$

In some embodiments, a delta for data trees may be generated as a set of differences to be applied to a copy of a data tree file to construct a copy of another data tree file. For example, a delta for the first data tree and the second data tree may be generated as a set of differences to be applied to a copy of the first data tree file to construct a copy of the second data tree file. The copy of the constructed data tree file (e.g., the second data tree file) may be converted into a copy of the other data tree (e.g., the second data tree). A client may receive such a delta to construct the other data tree or the other data tree file. For example, a client, responsive to receiving the delta, may be configured to perform the following: accessing the first data tree and the delta; converting the first data tree into the copy of the first data tree file; constructing the copy of the second data tree file by applying the delta to the copy of the first data tree file; and converting the copy of the second data tree file into the copy of the second data tree.

In some embodiments, a delta for data trees may be generated as a set of differences to be applied to an empty file to construct a copy of a data tree file. For example, a delta for the first data tree and the second data tree may be generated as a set of differences to be applied to an empty file to construct a copy of the second data tree file that uses the first data tree file. The copy of the constructed data tree file (e.g., the second data tree file) may be converted into a copy of the other data tree (e.g., the second data tree). A client may receive such a delta to construct the other data tree or the other data tree file. For example, a client, responsive to receiving the delta, may be configured to perform the following: accessing the delta; constructing the copy of the second data tree file by applying the delta to an empty file; and converting the copy of the second data tree file into the copy of the second data tree.

Figure 2:
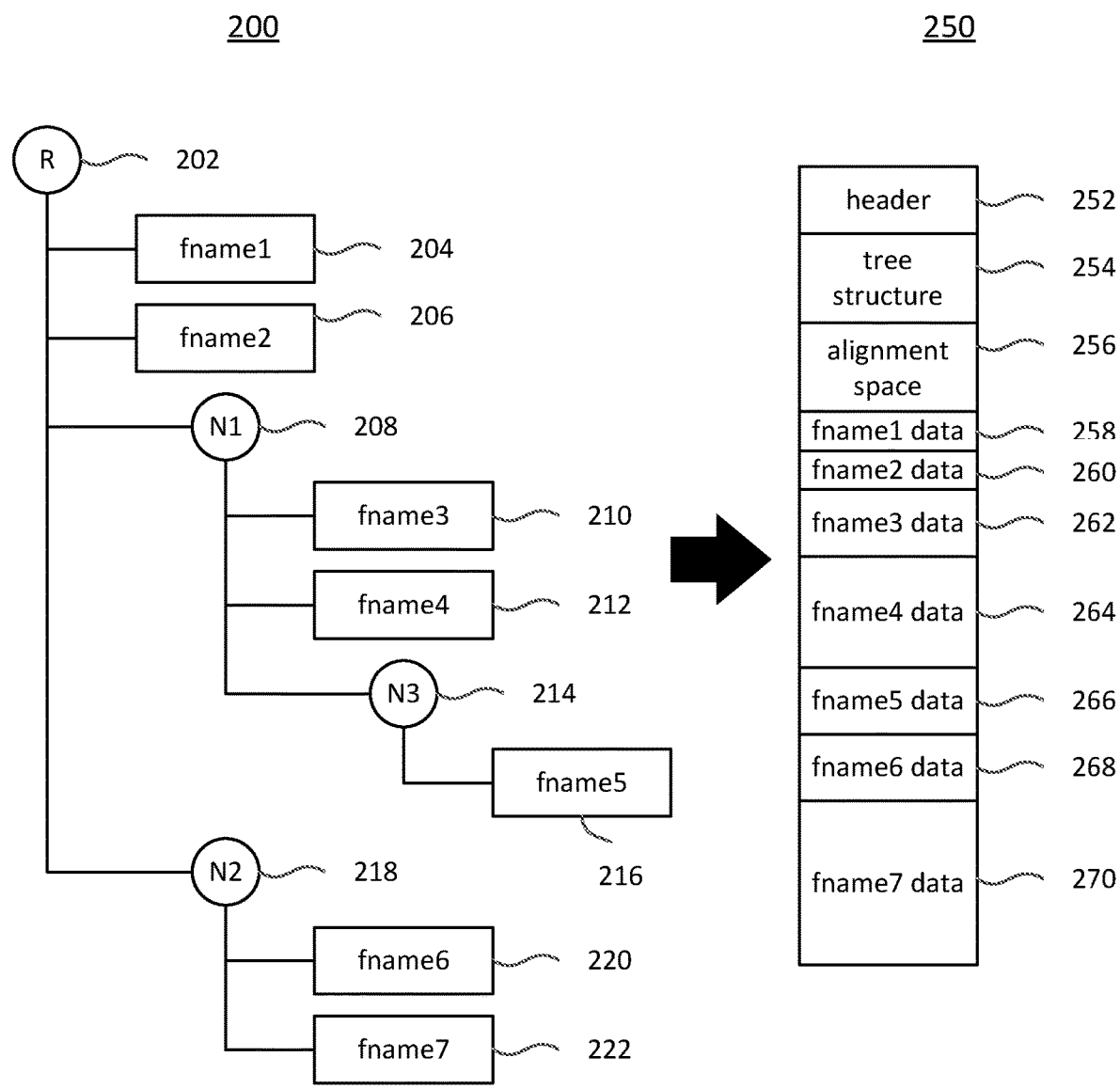
FIG. 2 illustrates an example conversion of a data tree into a data tree file, in accordance with various embodiments of the disclosure.

FIG. 2 illustrates an example conversion of a data tree 200 into a data tree file 250, in accordance with various embodiments of the disclosure. The data tree 200 may include directory nodes 202, 208, 214, 218 and file nodes 204, 206, 210, 212, 216, 220, 222. The data tree 200 may be converted into the data tree file 250, with information within the data tree file 250 being organized in accordance with a pack format. The pack format of the data tree file 250 may include a header 252. The header 252 may include header information of the data tree file 250. The header 252 may also include or may be adjacent to a tree structure 254. The tree structure 254 may define directory names and directory types of the directory nodes 202, 208, 214, 218. The tree structure 254 may be define file names, file types, and data locations (e.g., file address information, file size information) of file nodes 204, 206, 210, 212, 216, 220, 222. The data tree file 250 may include an alignment space 256, which may include spare space for alignment of data within the data tree file 250. The data tree file 250 may include data of individual file nodes 258, 260, 262, 264, 266, 268, 270, with the data of the individual file nodes placed in the order in which the data tree 200 is traversed for tree-to-file conversion. For example, the data tree 200 may be traversed in a top-down direction, and data of file node 204 may be included as data 258, data of file node 206 may be included as data 260, data of file node 210 may be included as data 262, data of file node 212 may be included as data 264, data of file node 216 may be included as data 266, data of file node 220 may be included as data 268, and data of file node 222 may be included as data 270 within the data tree file 250. Other pack formats for data tree files are contemplated.

Figure 3:
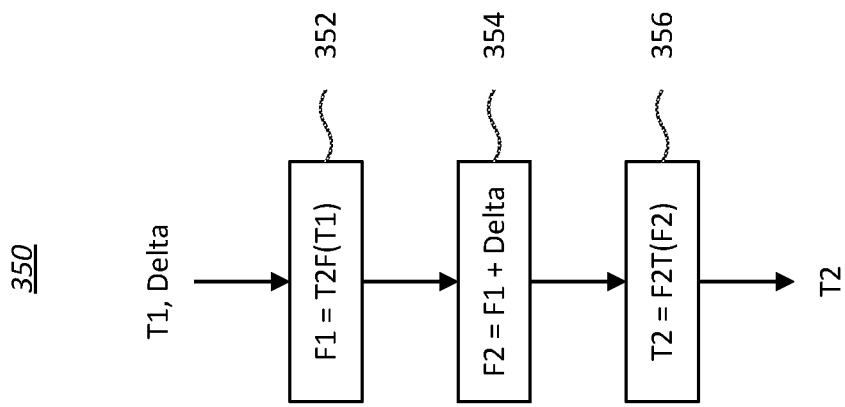
FIG. 3 illustrates example processes for generating delta of data trees and constructing a second data tree from a first data tree and a delta, in accordance with various embodiments of the disclosure.
Figure 3:
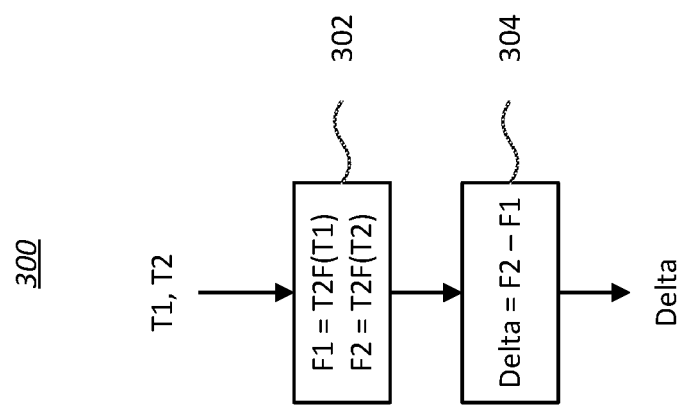

FIG. 3 illustrates an example process 300 for generating delta of data trees (diffing) and an example process 350 of constructing a second data tree from a first data tree and a delta (reconstruction), in accordance with various embodiments of the disclosure. Inputs to the process 300 may include two data trees (T1, T2). At step 302, tree-to-file conversion may be performed to generate two data tree files (F1, F2). At step 304, a delta may be generated as a difference of the two data tree files. Inputs to the process 350 may include a data tree (T1) and a delta. At step 352, a tree-to-file conversion may be performed to generate a data tree file (F1). Another data tree file (F2) may be constructed by applying the delta to the converted data tree file. The other data tree file may be converted into another data tree (T2).

Figure 4:
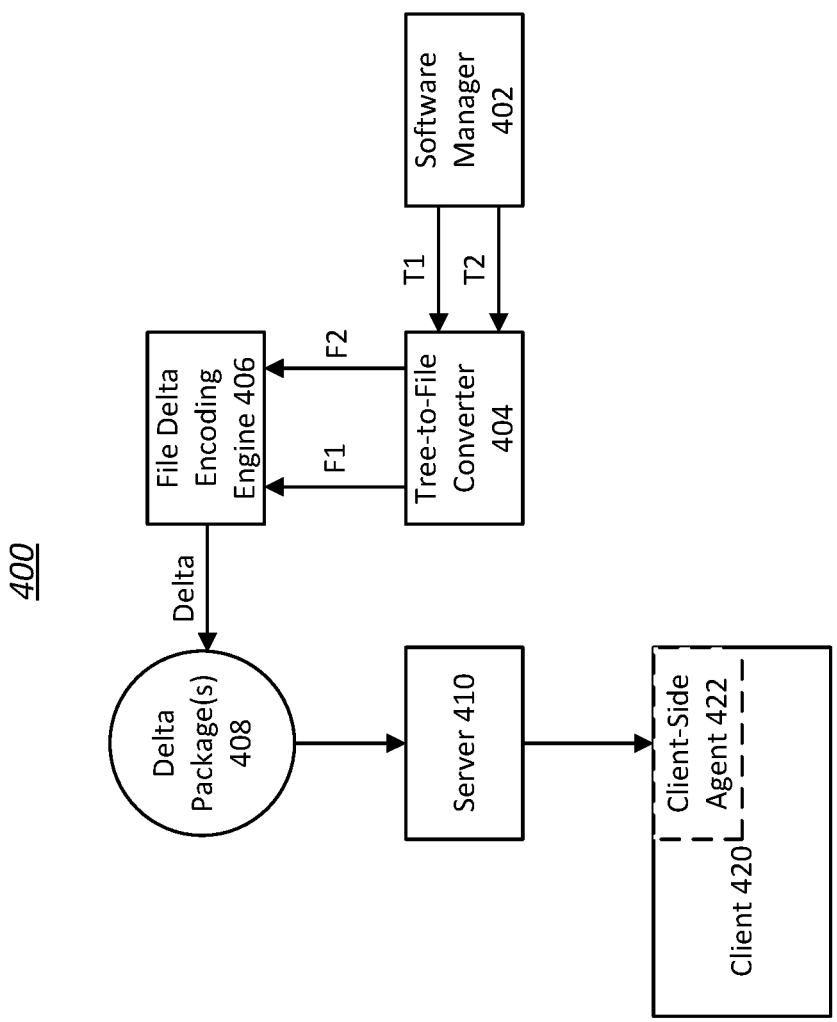
FIG. 4 illustrates an example client-server architecture, in accordance with various embodiments of the disclosure

FIG. 4 illustrates an example client-server architecture 400, in accordance with various embodiments of the disclosure. The architecture 400 may include a server 410 and a client 420. The client 420 may include a client-side agent 422. The server 410 may include or be coupled (directly or indirectly) to a software manager 402, a tree-to-file converter 404, and a file delta encoding engine 406. The software manager 402 may be configured to provide different data trees (T1, T2) to the tree-to-file converter 404. Individual data trees may include a set of directory nodes and a set of file nodes. In some embodiments, the data trees provided by the software manager 402 may be different versions of a data tree. For example, a first data tree (T1) provided by the software manager 402 may be one version of the data tree and a second data tree (T2) provided by the software manager 402 may be another version of the data tree. The data tree may be or include software. For instance, the first data tree (T1) provided by the software manager 402 may be one version of the software and a second data tree (T2) provided by the software manager 402 may be another version of the software.

The tree-to-file converter 404 may be configured to convert the trees provided by the software manager 402 into data tree files. For example, the tree-to-file converter may convert the first data tree into a first data tree file (F1) and convert the second data tree into a second data tree file (F2). The converted data tree files may be provided to the file delta encoding engine 406.

The file-delta encoding engine 406 may be configured to generate a delta for different data trees based on a comparison of the corresponding data tree files. For example, the file delta encoding engine 406 may generate a delta for the first data tree (T1) and the second data tree (T2) based on a comparison of the first data tree file (F1) and the second data tree file (F2). The delta may be packaged into one or more delta packages 408 for provision by the server 410 to the client-side agent 422.

The client-side agent 422 may be configured to modify a client-side version of the data tree based on the delta. For example, the client-side agent 422 may modify the client 420 or a client-side version of software (software installed in, stored by, used by the client 420) based on the delta. The client 420 (or the client-side agent 422) may update software of the client 420 using the tree-conversion delta encoding described herein.

For example, the delta for the first data tree (T1) and the second data tree (T2) may be generated as a set of differences to be applied to a copy of the first data tree file (F1) to construct a copy of the second data tree file (F2). The copy of the second data tree file (F2) may be converted into a copy of the second data tree (T2).

In some embodiments, the client 420 (or the client-side agent 422) may be configured to perform the following operations responsive to receiving the delta (or the delta packages 408) from the server 410: accessing the first data tree (T1) and the delta; converting the first data tree (T1) into the copy of the first data tree file (F1); constructing the copy of the second data tree file (F2) by applying the delta to the copy of the first data tree file (F1); and converting the copy of the second data tree file (F2) into the copy of the second data tree (T2).

As another example, the delta for the first data tree (T1) and the second data tree (T2) may be generated as a set of differences to be applied to an empty file to construct a copy of the second data tree file (F2). The copy of the second data tree file (F2) may be converted into a copy of the second data tree (T2).

In some embodiments, the client 420 (or the client-side agent 422) may be configured to perform one or more of the following operations responsive to receiving the delta (or the delta packages 408) from the server 410: accessing the delta; constructing the copy of the second data tree file (F2) by applying the delta to an empty file; and converting the copy of the second data tree file (F2) into the copy of the second data tree (T2).

Figure 5:
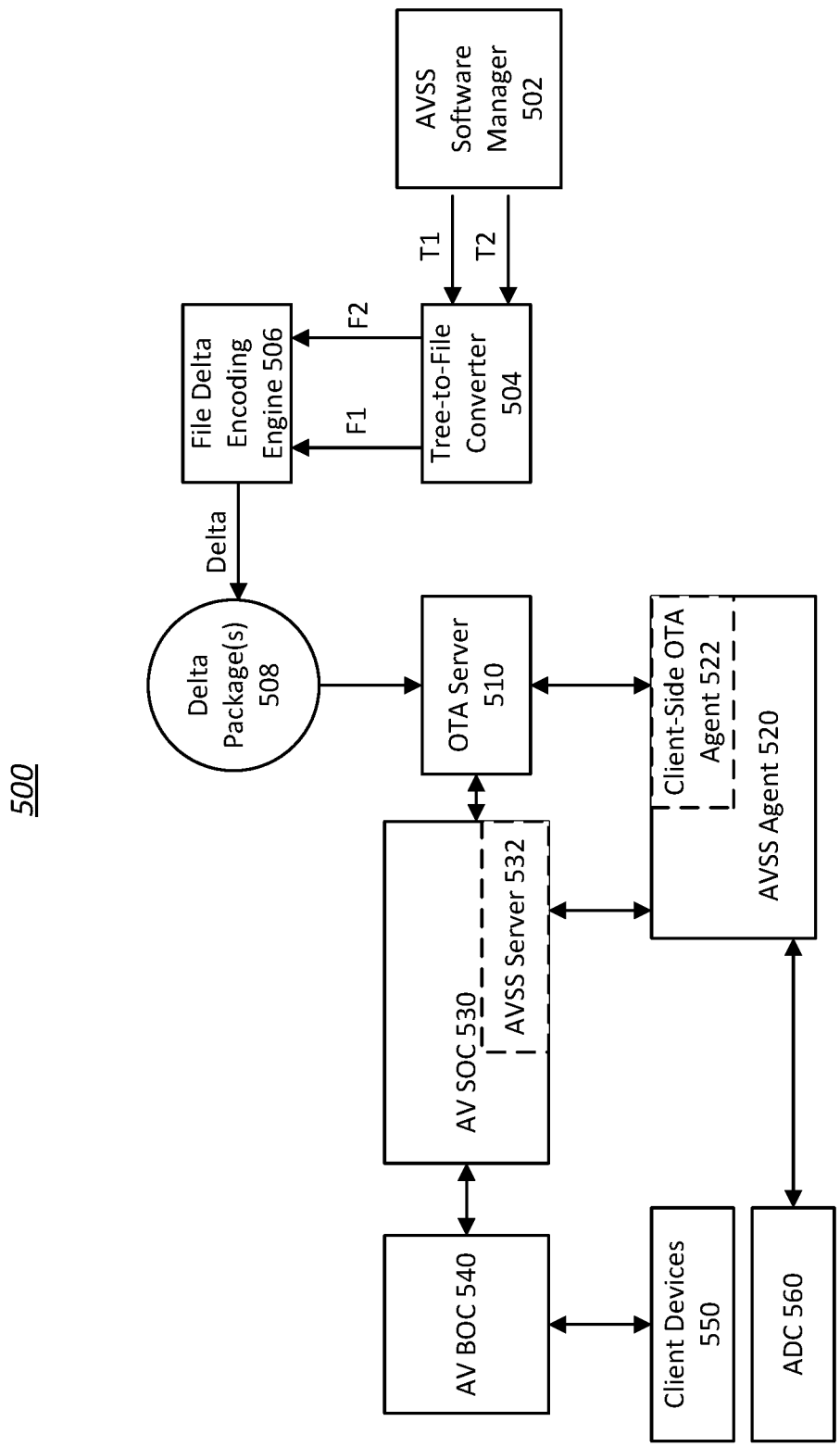
FIG. 5 illustrates an example client-server architecture, in accordance with various embodiments of the disclosure

FIG. 5 illustrates an example client-server architecture 500, in accordance with various embodiments of the disclosure. The client-server architecture 500 may be used to modify or update software, such as an autonomous vehicle safety and security (AVSS) software. Use of the same or similar architecture to modify or update other software are contemplated. The client-server architecture 500 may include an OTA server 510 and an AVSS agent 520. The AVSS agent 520 may include a client-side over-the-air (OTA) agent 522. In some embodiments, the client-side OTA agent 522 may be separate from the AVSS agent 520. The OTA server 510 may include or be coupled (directly or indirectly) to an AVSS software manager 502, a tree-to-file converter 504, and a file delta encoding engine 506.

The AVSS agent 520 may include some or all of the functionalities of the client 420. The client-side OTA agent 522 may include some or all of the functionalities of the client-side agent 422. The OTA server 510 may include some or all of the functionalities of the server 410. The AVSS software manager 502 may include some or all of the functionalities of the software manager 402. The tree-to-file converter 504 may include some or all of the functionalities of the tree-to-file converter 504. The file delta encoding engine 506 may include some or all of the functionalities of the file delta encoding engine 406. A delta generated by the file delta encoding engine 506 may be packaged into one or more delta packages 508 for provision by the OTA server 510 to the client-side OTA agent 522.

The AVSS agent 520 may operate on top of an autonomous driving controller (ADC) system for one or more tasks relevant to AVSS. The AVSS agent 520 may communicate with an AVSS server 532. The AVSS server 532 may be located in the cloud of autonomous vehicle security operations center (AV SOC) 530. The AVSS server 532 may perform one or more tasks relevant to AVSS, such as AV safety and security management, remote intervention, safety and security intelligence, safety and security analysis, and forensic analysis. The AV SOC 530 may operate as a security operations center for AV vehicles or fleets. The AV SOC 530 may support one or more safety and security operation functions for AV vehicles or fleets. The AV SOC 530 may communicate with an autonomous vehicle business operations center (AV BOC) 540. The AV BOC 540 may support one or more business operation functions for AV vehicles or fleets. The AV BOC 540 may communicate with one or more client devices 550, such as devices of vehicle drivers or riders.

The AVSS agent 520 may need to be modified or updated when a new AVSS agent software is available. The AVSS agent 520 (or the client-side OTA agent 522) may update software of the AVSS agent 520 using the tree-conversion delta encoding described herein. For example, the AVSS agent 520 (or the client-side OTA agent 522) may use a tree-to-file conversion to convert a data tree into a data tree file, apply the delta within the delta package(s) 508 to the data tree file, and then use a file-to-tree conversion to construct the modified/updated data tree. The AVSS agent 520 (or the client-side OTA agent 522) may perform other tasks, such as downloading the delta package(s) 508 from the OTA server 510, decrypting the delta package(s) 508, verifying the integrity of the delta package(s) 508, and verifying the integrity of the modified/updated data tree before overwriting the original data tree (overwriting the data tree of the AVSS agent 520). In some embodiments, the AVSS agent 520 (or the client-side OTA agent 522) may store the modified/updated data tree file so that a subsequent modification/update of the data tree does not require conversion of the data tree to a data tree file.

Figure 6A:
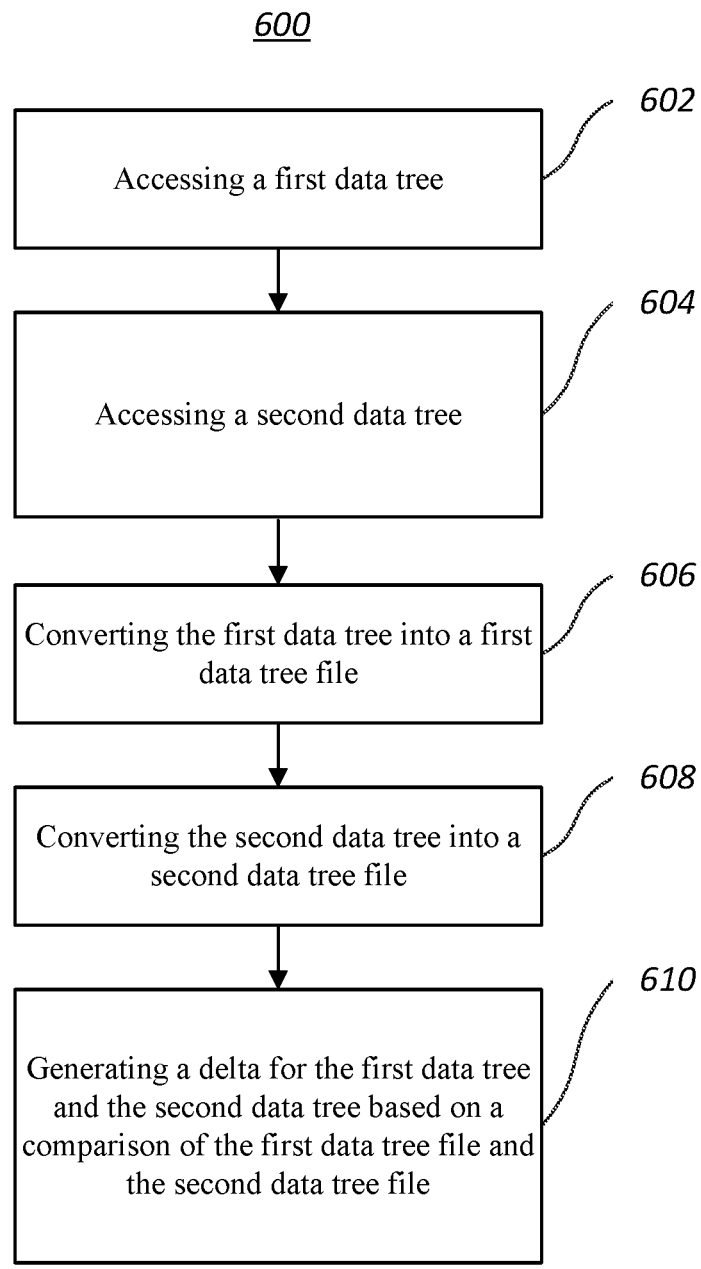
FIG. 6A illustrates a flow chart of an example method, in accordance with various embodiments of the disclosure.

FIG. 6A illustrates a flowchart of an example method 600, according to various embodiments of the present disclosure. The method 600 may be implemented in various environments including, for example, the environment 100 of FIG. 1, the architecture 400 of FIG. 4, or the architecture 500 of FIG. 5. The operations of the method 600 presented below are intended to be illustrative. Depending on the implementation, the method 600 may include additional, fewer, or alternative steps performed in various orders or in parallel. The method 600 may be implemented in various computing systems or devices including one or more processors.

With respect to the method 600, at block 602, a first data tree may be accessed. The first data tree may include a first set of directory nodes and a first set of file nodes. At block 604, a second data tree may be accessed. The second data tree may include a second set of directory nodes and a second set of file nodes. At block 606, the first data tree may be converted into a first data tree file. At block 608, the second data tree may be converted into a second data tree file. At block 610, a delta for the first data tree and the second data tree may be generated based on a comparison of the first data tree file and the second data tree file.

Figure 6B:
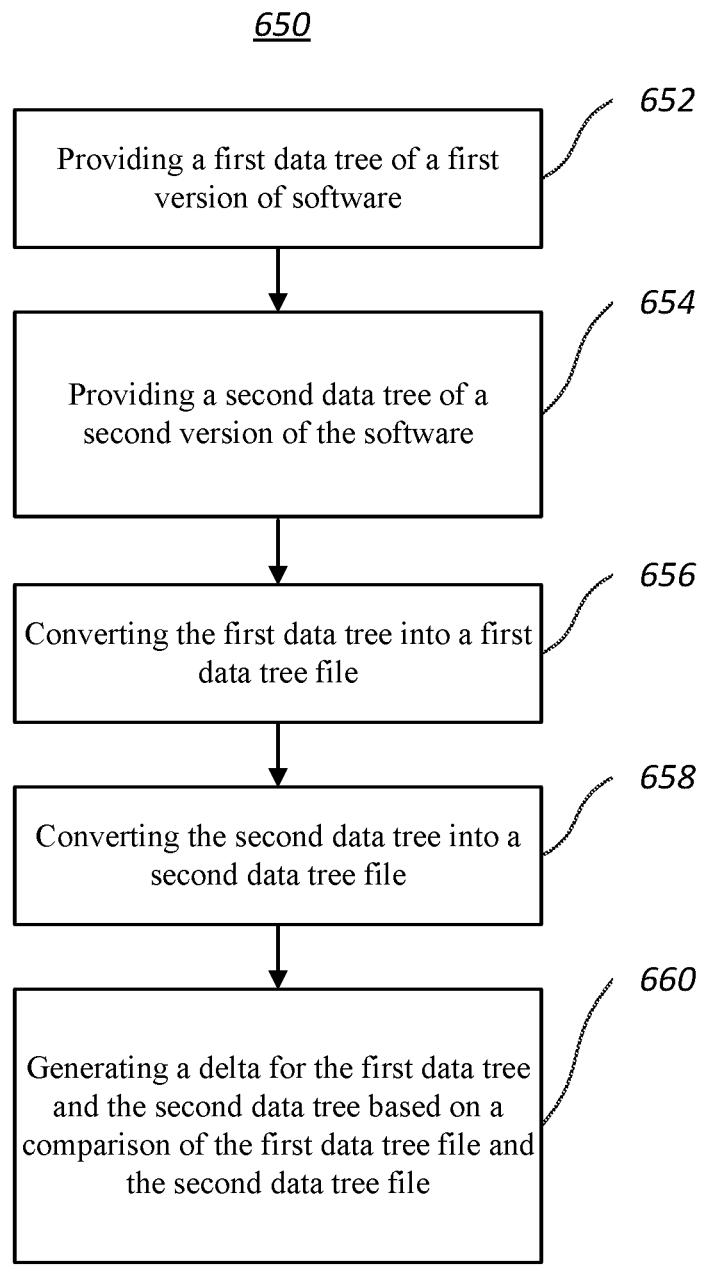
FIG. 6B illustrates a flow chart of an example method, in accordance with various embodiments of the disclosure.

FIG. 6B illustrates a flowchart of an example method 650, according to various embodiments of the present disclosure. The method 650 may be implemented in various environments including, for example, the environment 100 of FIG. 1, the architecture 400 of FIG. 4, or the architecture 500 of FIG. 5. The operations of the method 650 presented below are intended to be illustrative. Depending on the implementation, the method 650 may include additional, fewer, or alternative steps performed in various orders or in parallel. The method 650 may be implemented in various computing systems or devices including one or more processors.

With respect to the method 650, at block 652, a first data tree of a first version of software may be provided. The first data tree may include a first set of directory nodes and a first set of file nodes. At block 654, a second data tree of a second version of the software may be provided. The second data tree may include a second set of directory nodes and a second set of file nodes. At block 656, the first data tree may be converted into a first data tree file. At block 658, the second data tree may be converted into a second data tree file. At block 660, a delta for the first data tree and the second data tree may be generated based on a comparison of the first data tree file and the second data tree file. The delta may be packaged for provision to a client-side agent. The client-side agent may be configured to modify a client-side version of the software based on the delta.

Figure 7:
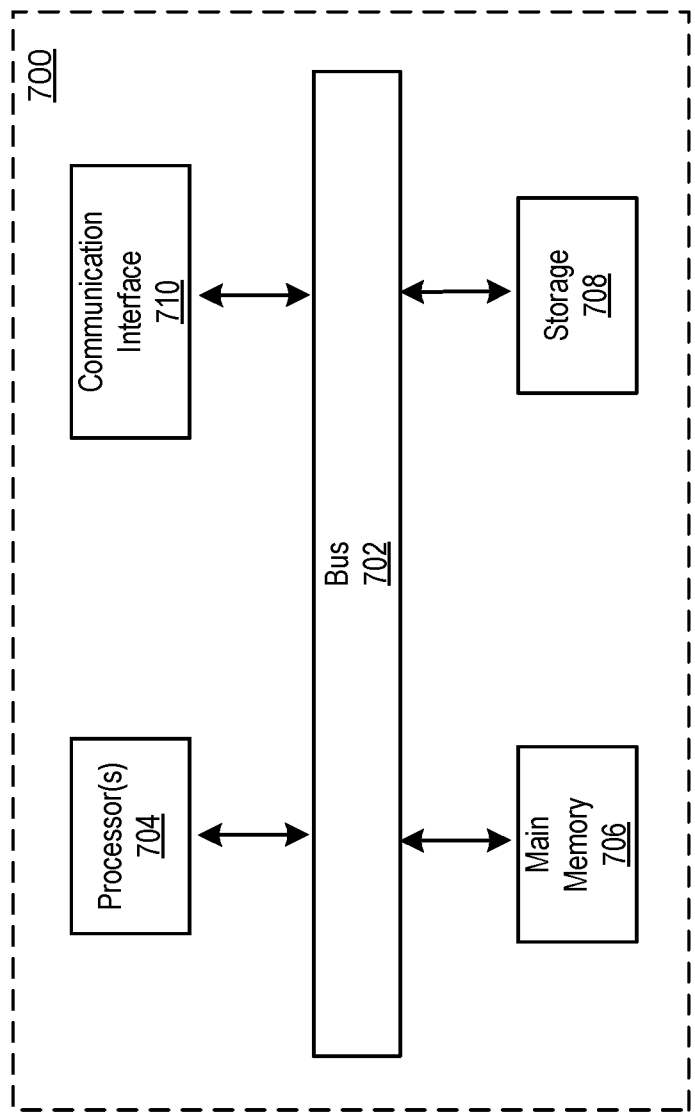
FIG. 7 illustrates a block diagram of an example computer system in which any of the embodiments described herein may be implemented.

FIG. 7 is a block diagram that illustrates a computer system 700 upon which any of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor(s) 704. Main memory 706 also may be used for storing temporary variables or other intermediate information during execution of instructions to be executed by processor(s) 704. Such instructions, when stored in storage media accessible to processor(s) 704, render computer system 700 into a special-purpose machine that is customized to perform the operations specified in the instructions. Main memory 706 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 708. Execution of the sequences of instructions contained in main memory 706 causes processor(s) 704 to perform the process steps described herein. For example, the process/method shown in FIG. 6A and/or FIG. 6B and described in connection with this figure may be implemented by computer program instructions stored in main memory 706. When these instructions are executed by processor(s) 704, they may perform the steps as shown in FIG. 6A and/or FIG. 6B and described above. In alternative embodiments, hardwired circuitry may be used in place of or in combination with software instructions.

The computer system 700 also includes a communication interface 710 coupled to bus 702. Communication interface 710 provides a two-way data communication coupling to one or more network links that are connected to one or more networks. As another example, communication interface 710 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for tree-conversion delta encoding, the system comprising:
   one or more processors; and
   a memory storing instructions that, when executed by the one or more processors, cause the system to perform:
      accessing a first data tree of a first version of a software, wherein the first data tree is a data structure including a set of directory nodes and a set of file nodes in the software;
      converting the first data tree into a first data tree file that is in a pack format;
      obtaining, from a computer device, a delta that represents differences between the first data tree file and a second data tree file that is converted from a second data tree of a second version of the software;
      applying the delta to the first data tree file to obtain an updated first data tree file;
      converting the updated first data tree file to an updated first data tree; and
      overwriting the first data tree with the updated first data tree, wherein the pack format specifies that the first data tree file includes:
         a header comprising header information of the first data tree file,
         a tree structure defining a file name, a file type, and a data location of each of the set of file nodes and a directory name and a directory type of each of the set of directory nodes,
         an alignment space for alignment of data within the first data tree file,
         data of each of the set of file nodes, wherein, in the first data tree file, the tree structure is outside the header and the data of each of the set of file nodes, and
         the tree structure is adjacent to the header, the alignment space is adjacent to the tree structure, and the data of the set of file nodes is adjacent to the alignment space.

2. The system of claim 1, wherein the pack format of the first data tree file is platform independent and does not include time stamp information, ownership information, and version information.

3. The system of claim 1, wherein the delta is based on a comparison of the first data tree file and the second data tree file using bsdiff, xdelta, or zdelta.

4. The system of claim 1, wherein conversion of the first data tree into the first data tree file is performed using tar.

5. The system of claim 1, wherein the delta is generated as a set of differences to be applied to a copy of the first data tree file to construct a copy of the second data tree file, and the copy of the second data tree file is converted into a copy of the second data tree.

6. A method, comprising:
   accessing a first data tree of a first version of a software, wherein the first data tree is a data structure including a set of directory nodes and a set of file nodes in the software;
   converting the first data tree into a first data tree file that is in a pack format;
   obtaining, from a computer device, a delta that represents differences between the first data tree file and a second data tree file that is converted from a second data tree of a second version of the software;
   applying the delta to the first data tree file to obtain an updated first data tree file;
   converting the updated first data tree file to an updated first data tree; and
   overwriting the first data tree with the updated first data tree, wherein the pack format specifies that the first data tree file includes:
      a header comprising header information of the first data tree file,
      a tree structure defining a file name, a file type, and a data location of each of the set of file nodes and a directory name and a directory type of each of the set of directory nodes, an alignment space for alignment of data within the first data tree file, data of each of the set of file nodes, wherein, in the first data tree file, the tree structure is outside the header and the data of each of the set of file nodes, and the tree structure is adjacent to the header, the alignment space is adjacent to the tree structure, and the data of the set of file nodes is adjacent to the alignment space.

7. The method of claim 6, wherein the delta is based on a comparison of the first data tree file and the second data tree file using bsdiff, xdelta, or zdelta.

8. The method of claim 6, wherein conversion of the first data tree into the first data tree file is performed using tar.

9. The method of claim 6, wherein the pack format of the first data tree file is platform independent and does not include time stamp information, ownership information, and version information.

10. The method of claim 6, wherein the delta is generated as a set of differences to be applied to a copy of the first data tree file to construct a copy of the second data tree file, and the copy of the second data tree file is converted into a copy of the second data tree.

11. A non-transitory computer-readable storage medium including instructions that, when executed by at least one processor of a computing system, cause the computing system to perform operations comprising:

accessing a first data tree of a first version of a software, wherein the first data tree is a data structure including a set of directory nodes and a set of file nodes in the software;

converting the first data tree into a first data tree file that is in a pack format;

obtaining, from a computer device, a delta that represents differences between the first data tree file and a second data tree file that is converted from a second data tree of a second version of the software;

applying the delta to the first data tree file to obtain an updated first data tree file;

converting the updated first data tree file to an updated first data tree; and overwriting the first data tree with the updated first data tree, wherein the pack format specifies that the first data tree file includes:

a header comprising header information of the first data tree file, a tree structure defining a file name, a file type, and a data location of each of the set of file nodes and a directory name and a directory type of each of the set of directory nodes, an alignment space for alignment of data within the first data tree file, data of each of the set of file nodes, wherein, in the first data tree file, the tree structure is outside the header and the data of each of the set of file nodes, and the tree structure is adjacent to the header, the alignment space is adjacent to the tree structure, and the data of the set of file nodes is adjacent to the alignment space.

12. The non-transitory computer-readable storage medium of claim 11, wherein the pack format of the first data tree file is platform independent and does not include time stamp information, ownership information, and version information.

13. The non-transitory computer-readable storage medium of claim 11, wherein the delta is based on a comparison of the first data tree file and the second data tree file using bsdiff, xdelta, or zdelta.

14. The non-transitory computer-readable storage medium of claim 11, wherein conversion of the first data tree into the first data tree file is performed using tar.

15. The non-transitory computer-readable storage medium of claim 11, wherein the delta is generated as a set of differences to be applied to a copy of the first data tree file to construct a copy of the second data tree file, and the copy of the second data tree file is converted into a copy of the second data tree.

16. The non-transitory computer-readable storage medium of claim 11, wherein the alignment space includes spare space.

17. The non-transitory computer-readable storage medium of claim 11, wherein the pack format specifies that, in the first data tree file, the tree structure is in the header.

* * * * *